United States Patent
Elsner

(10) Patent No.: US 10,102,881 B2
(45) Date of Patent: Oct. 16, 2018

(54) SYSTEMS AND METHODS OF THUMBNAIL GENERATION

(71) Applicant: WOWZA MEDIA SYSTEMS, LLC, Golden, CO (US)

(72) Inventor: Robert Elsner, Pine, CO (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

(21) Appl. No.: 14/695,297

(22) Filed: Apr. 24, 2015

(65) Prior Publication Data
US 2016/0314819 A1 Oct. 27, 2016

(51) Int. Cl.
*G11B 27/34* (2006.01)
*H04N 19/46* (2014.01)
*H04N 19/136* (2014.01)
*G11B 27/10* (2006.01)
*H04L 29/08* (2006.01)
*H04L 29/06* (2006.01)

(52) U.S. Cl.
CPC .......... *G11B 27/34* (2013.01); *G11B 27/102* (2013.01); *H04L 65/604* (2013.01); *H04L 67/10* (2013.01); *H04N 19/136* (2014.11); *H04N 19/46* (2014.11)

(58) Field of Classification Search
CPC ....... G11B 27/34; G11B 27/102; H04L 67/10; H04L 65/604; H04L 65/607; H04N 19/46; H04N 19/136
See application file for complete search history.

(56) References Cited

U.S. PATENT DOCUMENTS

| | | | |
|---|---|---|---|
| 6,332,003 B1 * | 12/2001 | Matsuura | H04N 19/30 375/240.23 |
| 7,031,596 B2 * | 4/2006 | Sai | G11B 19/022 348/E5.102 |
| 7,194,701 B2 | 3/2007 | Stavely et al. | |
| 7,751,683 B1 | 7/2010 | Belknap | |
| 8,196,045 B2 | 6/2012 | Chandratillake et al. | |
| 8,621,514 B2 | 12/2013 | Yao et al. | |
| 2002/0145622 A1 * | 10/2002 | Kauffman | G06F 17/3028 715/723 |
| 2004/0103233 A1 * | 5/2004 | Shinkai | G11B 27/031 710/260 |
| 2004/0128317 A1 * | 7/2004 | Sull | G06F 17/30849 |
| 2006/0090141 A1 * | 4/2006 | Loui | G06F 17/30064 715/764 |
| 2007/0106675 A1 * | 5/2007 | Watanabe | G11B 27/322 |
| 2007/0139743 A1 * | 6/2007 | Namizuka | H04N 1/0035 358/537 |
| 2007/0204238 A1 * | 8/2007 | Hua | G06F 17/30817 715/838 |

(Continued)

*Primary Examiner* — Gelek W Topgyal
(74) *Attorney, Agent, or Firm* — Toler Law Group, PC

(57) ABSTRACT

A method includes receiving a plurality of images at an encoder device and encoding the plurality of encoder images to generate an output video stream, where the output video stream includes a plurality of encoded video frames corresponding to the plurality of images. During generation of the output video stream, the encoder device receives a notification that a particular image of the plurality of images satisfies a thumbnail generation condition. In response to the notification, the encoder device generates a thumbnail from the particular image and sends the output video stream to a media server.

19 Claims, 7 Drawing Sheets

(56) References Cited

U.S. PATENT DOCUMENTS

| | | | | |
|---|---|---|---|---|
| 2008/0126543 | A1* | 5/2008 | Hamada | G06F 17/30038 709/225 |
| 2008/0155627 | A1* | 6/2008 | O'Connor | H04N 7/173 725/109 |
| 2009/0164567 | A1* | 6/2009 | Hara | G06F 3/0482 709/203 |
| 2009/0249208 | A1* | 10/2009 | Song | G11B 27/105 715/721 |
| 2010/0123816 | A1* | 5/2010 | Koh | G06F 17/30781 348/333.05 |
| 2010/0192099 | A1* | 7/2010 | Takagi | G09G 5/14 715/828 |
| 2010/0262912 | A1* | 10/2010 | Cha | G11B 27/105 715/719 |
| 2010/0303440 | A1* | 12/2010 | Lin | H04N 5/76 386/241 |
| 2011/0161818 | A1* | 6/2011 | Viljamaa | G11B 27/28 715/720 |
| 2011/0316817 | A1* | 12/2011 | Yamada | G06F 17/30905 345/204 |
| 2012/0128320 | A1* | 5/2012 | Nakamura | H04N 13/0055 386/239 |
| 2012/0141088 | A1* | 6/2012 | Isozu | G11B 27/005 386/230 |
| 2012/0171962 | A1* | 7/2012 | Yanagita | G11B 27/11 455/41.2 |
| 2012/0185568 | A1* | 7/2012 | Broyde | H04N 21/23439 709/219 |
| 2013/0080895 | A1* | 3/2013 | Rossman | G06F 3/04883 715/720 |
| 2013/0139200 | A1* | 5/2013 | Mountain | H04N 21/4312 725/41 |
| 2014/0099034 | A1 | 4/2014 | Rafati et al. | |
| 2014/0118625 | A1* | 5/2014 | Cho | H04N 5/44513 348/734 |
| 2014/0123160 | A1* | 5/2014 | van Coppenolle | H04L 67/30 725/5 |
| 2014/0123161 | A1* | 5/2014 | van Coppenolle | H04L 65/4076 725/8 |
| 2014/0129676 | A1* | 5/2014 | Zeng | H04W 4/18 709/217 |
| 2014/0132797 | A1 | 5/2014 | Okada | |
| 2014/0169754 | A1* | 6/2014 | Jarvinen | G06F 17/30026 386/230 |
| 2014/0245145 | A1* | 8/2014 | Kim | G06K 9/00744 715/716 |
| 2014/0282262 | A1* | 9/2014 | Gregotski | H04N 21/2387 715/838 |
| 2015/0346984 | A1* | 12/2015 | Flint | G06F 3/04847 715/720 |
| 2016/0134673 | A1* | 5/2016 | MacInnis | H04L 65/60 709/231 |

* cited by examiner

SYSTEMS AND METHODS OF THUMBNAIL GENERATION

BACKGROUND

The popularity of the Internet, coupled with the increasing capabilities of personal/mobile electronic devices, has provided consumers with the ability to enjoy multimedia content almost anytime and anywhere. For example, live content (e.g., sports events) and video on demand (VOD) content (e.g., television shows and movies) can be streamed via the Internet to personal electronic devices (e.g., computers, mobile phones, Internet-enabled televisions, etc.). Various types of personal electronic devices are available to consumers. Different devices may have different screen sizes and may be compatible with different audio formats, video formats, streaming protocols, wireless connection speeds, etc.

VOD systems often provide preview frames corresponding to certain portions of a video. The preview frames can be used during seek operations. For example, when a user rewinds or fast-forwards the video, the preview frames can be used to show an approximate location within the video that the user has rewound or fast-forwarded to. Preview frames (alternatively referred to as "thumbnails") are typically generated at an external decoder, such as at a player device, based on i-frames of an encoded VOD content item. However, generating thumbnails at a player device may consume an unacceptably high amount of resources in mobile phones and other resource-restricted devices.

SUMMARY

Selected embodiments of the present application are directed to encoder-side thumbnail generation that occurs during or in parallel with a video encoding process that generates i-frames, p-frames, and b-frames of an output stream from "raw" input images. The "raw" input images may be uncompressed and/or unencrypted images received from a capture device (e.g., camera), such as via a high-definition serial data interface (HD-SDI). The present application supports thumbnail generation for both live and VOD scenarios. During video encoding, the encoder is notified when an input video frame satisfies a thumbnail generation condition. Examples of thumbnail generation conditions include, but are not limited to, detecting motion, detecting predominance of a particular color in the input video frame, detecting a particular object in the input video frame, etc. As another example, a thumbnail can be generated based on information external to the input video frame. For example, during a live event, the encoder may be coupled to a sentiment analysis engine that determines when a spike in social media sentiment occurs (e.g., excitement after a touchdown, shock after the death of a major television show character, etc.), and the encoder may receive a notification to generate a thumbnail at such points in time.

In response to the notification, the encoder converts and/or compresses the input video frame into a thumbnail and embeds the thumbnail into the encoder output stream as a supplemental data package. The supplemental data package may also include metadata regarding the thumbnail, such as a timestamp that can be used to correlate the thumbnail to a specific point in time in the encoded video. The thumbnail may have the same pixel resolution as the input video frame or can have a different (e.g., smaller) resolution. By generating thumbnails from the "raw" input images, the present application is not limited to providing thumbnails only for i-frames, but can instead generate a thumbnail for any type of frame at any point in time of a video asset, including generating thumbnails from images that end up being encoded as p-frames or b-frames.

A media server that receives an output stream from the encoder may detect the presence of thumbnail(s) in the output stream and may extract the thumbnail(s). The media server may also provide (e.g., on demand) the thumbnail(s) to one or more player devices. For example, the media server may generate an adaptive streaming manifest that identifies thumbnails instead of or in addition to video chunks, and the media server may provide individual thumbnails when requested by a player device. The media server may also format a thumbnail requested by a player device in accordance with an adaptive streaming protocol in use at the player device. For example, the media server may convert thumbnails into a file format (e.g., joint photographic experts group (JPEG), portable network graphics (PNG), etc.) that is supported by the player device and/or the adaptive streaming protocol. At the player device, the thumbnails can be shown in a "scrub bar" interface to aid in rewinding and fast-forwarding a video stream. Alternatively, or in addition, the thumbnails can be used to display a thumbnail index of points of interest within a video. For example, the media server may provide the thumbnails to the player device before providing any video to the player device. The player device can display the thumbnail index, prompt a user to select a thumbnail, and request video content starting from a point in time in a video file corresponding to the selected thumbnail. It will be appreciated that using a thumbnail index can save bandwidth and is faster than the user starting the video stream and then rewinding/fast-forwarding multiple times until a desired point in the video is found, which can involve stopping and restarting transmission of the video stream to the player device multiple times and cause multiple buffering delays at the player device.

In an alternative embodiment, the media server (instead of the encoder) can generate the thumbnail(s) based on the encoded video stream received from the encoder. For example, the media server can maintain a frame buffer that stores the most recently received i-frame and subsequent p-frames and/or b-frames, so that the media server can generate a thumbnail in response to receiving a thumbnail generation notification. To illustrate, a thumbnail can be generated from a p-frame or a b-frame by using the buffer to decode the p-frame or b-frame based on one or more preceding and/or subsequent i-frames that are stored in the buffer.

DETAILED DESCRIPTION

Figure 1:
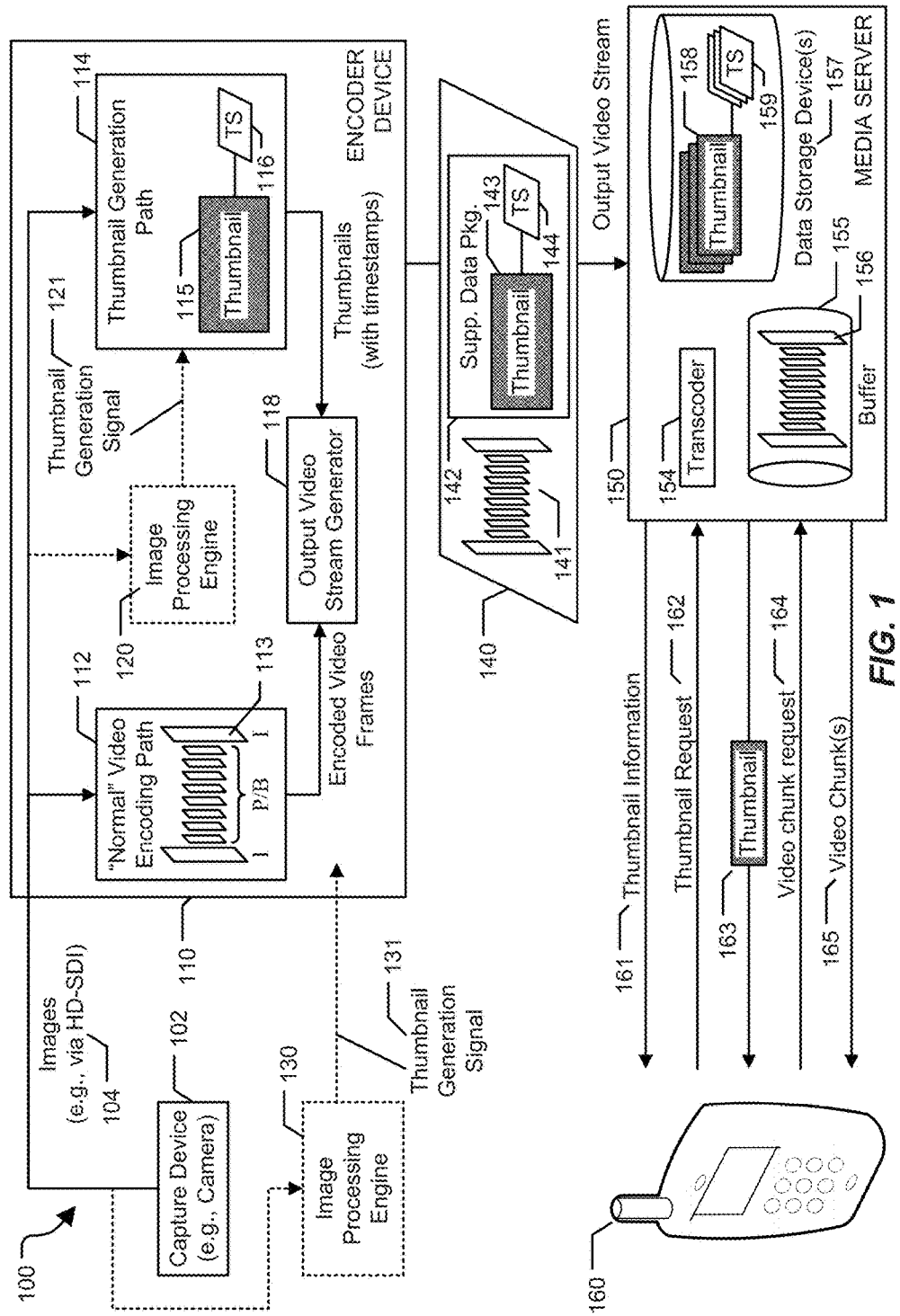
FIG. 1 is a diagram of a particular embodiment of a system that is operable to support thumbnail generation at an encoder device.

FIG. 1 illustrates a particular embodiment of a system 100 that is operable to support thumbnail generation at an encoder device 110. The system 100 also includes a media server 150 coupled to the encoder device 110. The encoder device 110 is configured to receive a plurality of images 104 from a capture device 102, such as a camera or other image/video capture device. Alternatively, the encoder device 110 may receive images from a different type of computing device or server. The media server 150 may receive data (e.g., from the encoder device 110) and send data (e.g., to other servers or computing devices, such as an illustrative player device 160) via a network. For example, the media server 150 may communicate via networks, such as a local area network (LAN) or the Internet, via a wired or wireless network connection. It should be noted that although certain operations may be described herein as being performed by the encoder device 110, the media server 150, and the player device 160, in alternative embodiments such operations may be performed by one or more other types of devices, such as desktop computers, laptop computers, smartphones, tablet computers, portable computing devices, cloud servers, etc. Moreover, operations described as being performed by one device may alternatively be performed by another device.

In a particular embodiment, the capture device 102 is a video camera that includes an optical system (e.g., including a lens) and an imaging device (e.g., a charge coupled device (CCD)) configured to convert an image captured by optical system into an electrical signal. The video camera may also include a field programmable gate array (FPGA), a camera control unit (CCU), a microprocessor, a timing signal generator, and an analog front-end pre-processor (e.g., for noise reduction and level adjustment), to process the signal(s) from the imaging device. The video camera may further include a high-definition serial digital interface (HD-SDI) that is used to provide the images 104 to the encoder device 110 (e.g., using a cable or wireless communication). Alternatively, different technology may be used, such as a high-definition multimedia interface (HDMI), a Thunderbolt interface, and/or an uncompressed video transmission protocol, as illustrative non-limiting examples. In a particular embodiment, as shown in FIG. 1, the encoder device 110 is external to the capture device 102. However, in alternative embodiments, the encoder device 110 may be internal to the capture device 102. The images 104 provided to the encoder device 110 may be "raw" images that are unencrypted and/or uncompressed.

The encoder device 110 may include an encoding path 112 that is configured to generate encoded video frames 113 based on the images 104 received from the capture device 102. In one example, a single encoded video frame is generated from each corresponding image. Generating the encoded video frames 113 may include compressing video data (e.g., pixel information) included in the images 104. For example, the encoded video frames 113 may correspond to digital video content that can include 3 types of video frames: intracoded frames (i-frames, alternately referred to as key frames), predicted frames (p-frames), and bi-directionally predicted frames (b-frames). An i-frame is a "complete" picture (e.g., image frame) that can be decoded independently of whether any preceding or subsequent frames have been received by a player device. Thus, i-frames can be said to have no dependencies on other frames. Decoding of a p-frame is dependent on preceding frame(s), and decoding of a b-frame is dependent on preceding frame(s) and/or future frame(s). Because i-frames have no dependencies, video playback at a player device (e.g., the player device 160) typically begins once an i-frame is received. A sequence of encoded video frames that includes i-frame(s) and one or more p-frames or b-frames that depend on the i-frame(s) may be referred to as a group of pictures (GOP) and may be a self-contained unit that can be decoded independently of any previously or subsequently received GOP, since the i-frame(s) needed to decode each frame of the GOP is included in the GOP. A GOP may alternatively be referred to as a video "chunk."

In FIG. 1, the encoding path 112 is designated as a "normal" encoding path to distinguish the encoding path 112 from a thumbnail generation path 114. As shown in FIG. 1, the images 104 provided to the normal encoding path 112 may also be provided to the thumbnail generation path 114, which operates in parallel with the normal encoding path 112. The thumbnail generation path 114 may be configured to generate thumbnails 115 based on one or more of the received images 104. The thumbnail generation path 114 may also determine a timestamp 116 corresponding to the image from which the thumbnail 115 is generated. In a particular embodiment, the thumbnail generation path 114 disregards received images 104 until a thumbnail generation signal 121 is received (or asserted). The thumbnail generation signal 121 may be generated by an image processing engine 120 as a notification that a particular image of the images 104 satisfies a thumbnail generation condition. In response to the thumbnail generation signal 121, the thumbnail generation path 114 may generate the thumbnail 115 based on the particular image and may note the timestamp 116 corresponding to the particular image. The timestamp 116 may indicate a time that the particular image was generated by the capture device 102, a playback time (e.g., within an encoded video stream) of an encoded video frame 113 corresponding to the particular image. Thus, the thumbnail generation path 114 may perform on-demand encoder-side thumbnail generation based on one or more thumbnail generation conditions being satisfied.

The image processing engine 120 may process the images 104 to determine when one or more thumbnail generation conditions are satisfied. Various thumbnail generation conditions may be used to determine whether or not to generate a thumbnail. For example, a thumbnail generation condition may be satisfied when a threshold amount of motion is detected between an image and a preceding image (e.g., when a security camera detects motion). As another example, a thumbnail generation condition may be satisfied when a threshold amount of an image (e.g., e.g., a threshold number of pixels) includes a particular color, saturation, hue, luminosity, etc. (e.g., when a particular color light turns on in a scene captured by a camera or when a person with a particular color shirt walks in front of the camera). As another example, a thumbnail generation condition may be satisfied when a particular region of an image differs from a corresponding region of a preceding image by a threshold amount (e.g., a scoreboard superimposed on video of a live soccer match changing when a goal is scored, but not as the game clock advances). As another example, a thumbnail generation condition may be satisfied when a timer expires (e.g., for periodic thumbnail generation at the encoder device 110). As another example, a thumbnail generation condition may be satisfied when a particular object is detected in an image. To illustrate, the image processing engine 120 may execute one or more edge detection, feature extraction, object recognition, and or computer vision algorithms, and may assert the thumbnail generation signal 121 when the particular object is detected (e.g., a thumbnail may be generated when a security camera detects a person, but not when a house pet passes in front of the security camera).

It should be noted that in alternative embodiments, an image processing engine 130 external to the encoder device 110 may receive the images 104 and may provide a thumbnail generation signal 131 to the encoder device 110. In yet another embodiment, an image processing engine may be present at the capture device 102 or at the media server 150 (e.g., as further described with reference to FIG. 2).

In a particular embodiment, a thumbnail generation signal (e.g., the thumbnail generation signal 121 or the thumbnail generation signal 131) may be generated independent of the images 104. As an illustrative non-limiting example, the images 104 may correspond to a live event, such as a live event being captured by the capture device 102 or by another capture device. Examples of live events include, but are not limited to, live sporting events, television shows or movies that are airing (e.g., being broadcast), etc. A device configured to generate the thumbnail generation signal 121 or 131 may monitor social networking activity associated with the live event. For example, the device may track social networking posts that mention the live event, include a particular "hashtag," etc. When more than a threshold amount of social networking activity (e.g., a number of social networking mentions per second) occurs with respect to the live event, the thumbnail generation signal 121 (or 131) may be asserted. Thus, thumbnails may automatically be generated in response to a flurry of social networking activity caused by an exciting play during a sporting event, the death of a beloved television or movie character, or another event.

It should be noted that the above-described thumbnail generation conditions are for illustration only and are not to be considered limiting. More, fewer, and/or different thumbnail generation conditions may be used in alternative embodiments.

The encoder device 110 may include an output video stream generator 118. The output video stream generator 118 may receive the encoded video frames 113 from the encoding path 112 and may generate an output video stream 140 that is based on (e.g., that includes) the encoded video frames 113. For example, the output video stream 140 may include encoded video frames 141 that are identical to or based on the encoded video frames 113. The output video stream generator 118 may transmit (or may cause transmission of) the output video stream 140 to another device, such as the media server 150 and/or the player device 160, as illustrative non-limiting examples. During generation and/or transmission of the output video stream 140, the output video stream generator 118 may receive a thumbnail 115 and a corresponding timestamp 116 from the thumbnail generation path 114. In response, the output video stream generator 118 may add the thumbnail 115 (e.g., as thumbnail 143) and the timestamp 116 (e.g., as timestamp 144) to the output video stream 140.

For example, when the output video stream 140 is being communicated to the media server 150 in accordance with a media communication protocol, the thumbnail 143 and the timestamp 144 may be added to a supplemental data package 142 supported by the media communication protocol. The supplemental data package 142 may thus represent a protocol-supported tunneling mechanism that can be used to communicate non-video and non-audio content, such as thumbnails and timestamps. Examples of media communication protocols are further described with reference to FIG. 2. It should be noted that in alternative embodiments, the thumbnail 143 and the timestamp 144 may be sent via a separate (e.g., side channel) connection between the encoder device 110 and the media server 150. It should also be noted that in particular embodiments, metadata other than a timestamp may be sent with a thumbnail instead of, or in addition to, the timestamp. For example, other metadata associated with a thumbnail may identify a geographic location of the capture device 102, a type of the capture device 102, one or more properties of the encoder device 110, etc.

The media server 150 may include a buffer 155 and data storage device(s) 157, which may include non-volatile storage devices (e.g., disk-based storage device(s)), cache storage devices (e.g., static random-access memory (SRAM)), or a combination of both. The media server 150 may receive the output video stream 140 from the encoder device 110 and may store the encoded video frames 141 of the output video stream 140 in the buffer 155 (e.g., as encoded video frames 156). The media server 150 may also extract thumbnails (e.g., the thumbnail 143) from the output video stream 140 and may store the extracted thumbnails in the data storage device(s) 157 as the thumbnails 158. Each of the thumbnails 158 may correspond to a respective encoded video frame 141 of the output video stream 140 and may be associated with a timestamp 159 of the encoded video frame 141.

In a particular embodiment, the media server 150 includes a transcoder 154. The transcoder 154 may generate multiple versions of the output video stream 140 for communication to player devices, such as the player device 160. For example, to facilitate the use of adaptive bitrate (ABR) streaming, the transcoder 154 may generate multiple ABR renditions of the output video stream 140. Each ABR rendition may have a distinct bitrate (e.g., video bitrate and/or audio bitrate). ABR renditions may also differ from each other with respect to other audio and video quality parameters, such as frame size, frame rate, video coder/decoder (CODEC), audio CODEC, number of audio channels, etc. Thus, the transcoder 154 may perform bitrate conversion, CODEC conversion, frame size conversion, etc. The media server 150 may provide one or more of the ABR renditions generated by the transcoder 154 to other devices, such as the player device 160. ABR streaming is further described with reference to FIG. 2.

During operation, the encoder device 110 may generate the output video stream 140, which may include encoded video frames, thumbnails, and metadata (e.g., timestamps) associated with the thumbnails. The encoder device 110 may send the output video stream 140 to the media server 150. The media server 150 may extract and store the thumbnails and associated metadata (e.g., timestamps), and the media server 150 may provide the extracted thumbnails and associated metadata to player devices, such as the player device 160.

For example, the media server 150 may send thumbnail information 161 identifying the thumbnails 158 to the player device 160. The media server 150 may send the thumbnail information 161 to the player device 160 in response to receiving a request from the player device 160 or without receiving a prior request from the player device 160. The media server 150 may also provide individual thumbnails (e.g., a thumbnail 163) to the player device 160. In a particular embodiment, the thumbnail 163 is provided to the player device 160 in response to a thumbnail request 162 that identifies the thumbnail 163 (e.g., by timestamp). In an illustrative example, the player device 160 receives the thumbnail 163 in accordance with an ABR streaming protocol.

Figure 3:
FIG. 3 is a diagram of a particular embodiment of a scrub bar interface including thumbnails.

The player device 160 may use the thumbnail information 161 and/or the thumbnail 163 to generate various interface (s). For example, the player device 160 may generate an interface that enables a user to request a particular thumbnail and/or a portion of the output video stream 140 corresponding to the particular thumbnail for playback. As a first example, FIG. 3 illustrates a "scrub bar" interface 300 that may be generated and displayed by the player device 160. The interface 300 includes a scrub bar 302 that represents a playback duration of a video stream that is being played. A user may use the scrub bar 302 to seek forwards and backwards in the video stream.

In the example of FIG. 3, the video stream is 25 minutes (25:00) long. For example, the video stream may be a pre-recorded video on demand (VOD) or digital video recorder (DVR) item whose length is known. Alternatively, if the video stream is live, the length of the video stream may not be known, and seeking backwards may be supported but seeking forwards beyond a "current" time may not be supported.

When a user selects (e.g., using a finger on a touchscreen, a mouse pointer, etc.) a particular location on the scrub bar 302, the interface 300 may automatically display a thumbnail corresponding to the location on the scrub bar 302. To illustrate, when the user selects a first location on the scrub bar 302 corresponding to 5 minutes and 15 seconds (5:15) into the video stream, the interface 300 displays a first thumbnail 304. When the user selects a second location on the scrub bar 302 corresponding to 20 minutes and 12 seconds (20:12) into the video stream, the interface 300 displays a second thumbnail 306. Thus, the interface 300 may assist the user in locating a scene of interest by displaying thumbnails corresponding to different points in time within the video stream.

In a particular embodiment, the player device 160 requests the thumbnails 304 and 306 on demand, e.g., after the user selects the first location and the second location on the scrub bar 302. To illustrate, in response to the user selecting the first location, the player device 160 may send the thumbnail request 162 to the media server 150, where the thumbnail request 162 includes the timestamp "5:15," indicating to the media server 150 that the player device 160 is requesting a thumbnail that is "closest" to the timestamp 5:15. In response to the thumbnail request 162, the media server 150 may identify the closest thumbnail 304 and may send the thumbnail 304 to the player device 160 (e.g., as the thumbnail 163). The player device 160 may then display the thumbnail 304 on the scrub bar interface 300, as shown. Similarly, when the user selects the second location on the scrub bar, the player device 160 may send another thumbnail request 162 including the timestamp "20:12" and may receive the thumbnail 306 from the media server 150 in response.

The thumbnails 304 and 306 may assist the user in rewinding or fast-forwarding the video stream with a reduced amount of guessing and scanning for a particular scene of interest. For example, when the user selects the first location on the scrub bar 302 and/or the thumbnail 304, the player device 160 may determine the corresponding timestamp (e.g., "5:15") and may send a video chunk request 164 that includes the timestamp to the media server 150. In response to the video chunk request 164, the media server 150 may restart the video stream being provided to the player device at an i-frame of a video chunk that begins closest to the timestamp (e.g., closest to 5:15 into the video). For example, the media server 150 may begin transmitting a sequence of video chunk(s) 165 to the player device 160 starting from the video chunk that begins closest to the timestamp.

Figure 4:
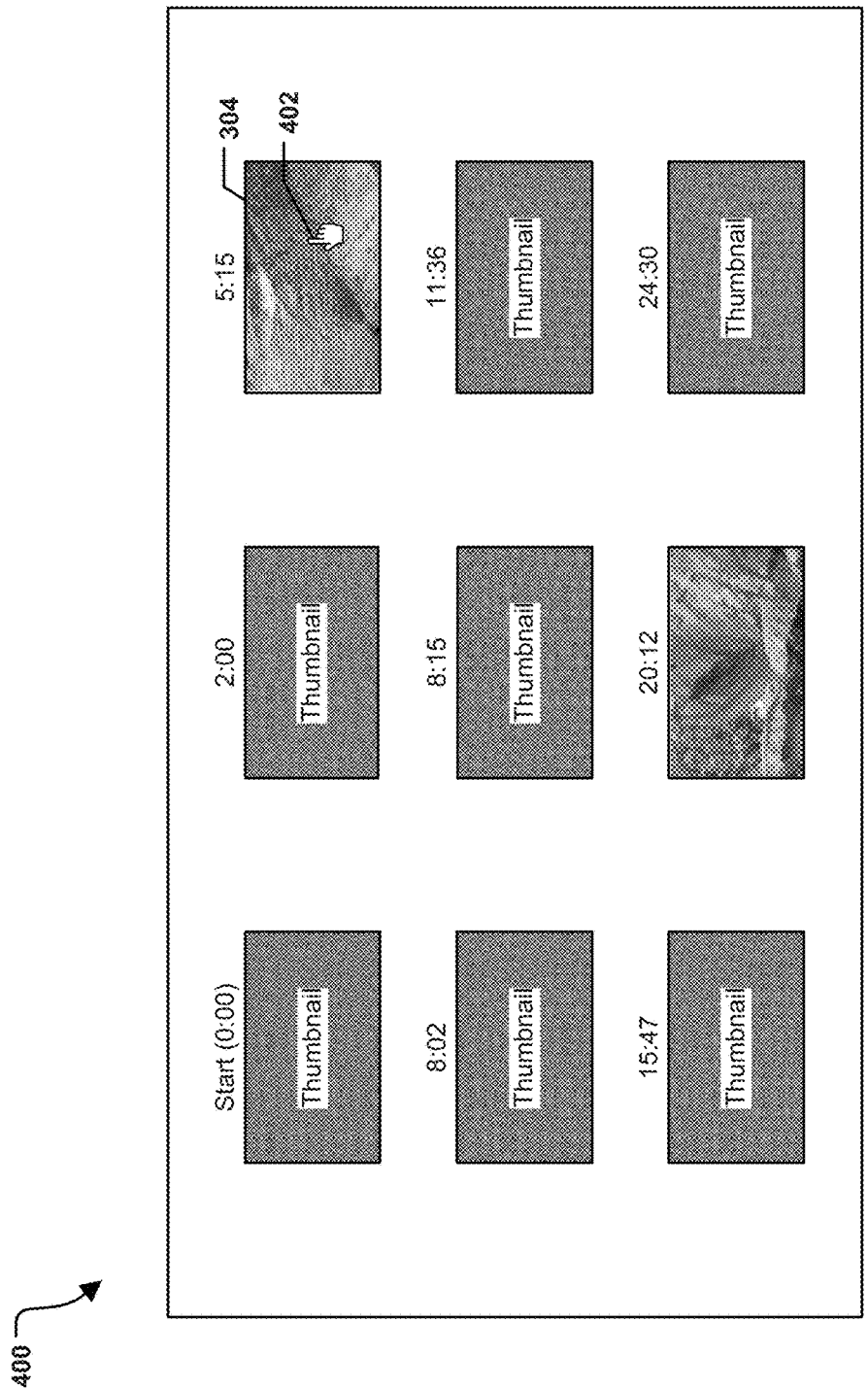
FIG. 4 is a diagram of a particular embodiment of a thumbnail index interface.

In an alternative embodiment, the player device 160 may receive thumbnails before video chunks, e.g., before video playback begins. To illustrate, FIG. 4 shows a frame index 400 that may be generated by the player device 160 prior to video playback. The frame index 400 includes multiple thumbnails corresponding to the video stream, including the thumbnails 304 and 306. Each of the thumbnails in the frame index 400 may be provided by the media server 150 to the player device 160 before video chunks are provided. A user at the player device 160 may use the frame index 400 to identify a point of interest in the video stream and may select the corresponding thumbnail to initiate playback of the video stream from a time that is near the timestamp of the selected thumbnail. In the example of FIG. 4, the user selects the thumbnail 304, as shown at 402. In response to selection of the thumbnail 304, the player device 160 may send the video chunk request 164 including the timestamp of the thumbnail 304 and may receive the video chunk(s) 165, starting with a video chunk that is closest to the timestamp.

FIG. 1 thus illustrates a system 100 that supports thumbnail generation at an encoder device 110. Generating the thumbnails at the encoder device 110 may be preferable to generating the thumbnails at a player device, such as when the player device is a mobile device or other device with limited computational resources. In addition, the encoder device 110 may be configured to generate a thumbnail from any of the received images 104, whereas a player device that generates thumbnails may be limited to generating thumbnails from i-frames, since p-frames and b-frames may not include "complete" image data.

Figure 2:
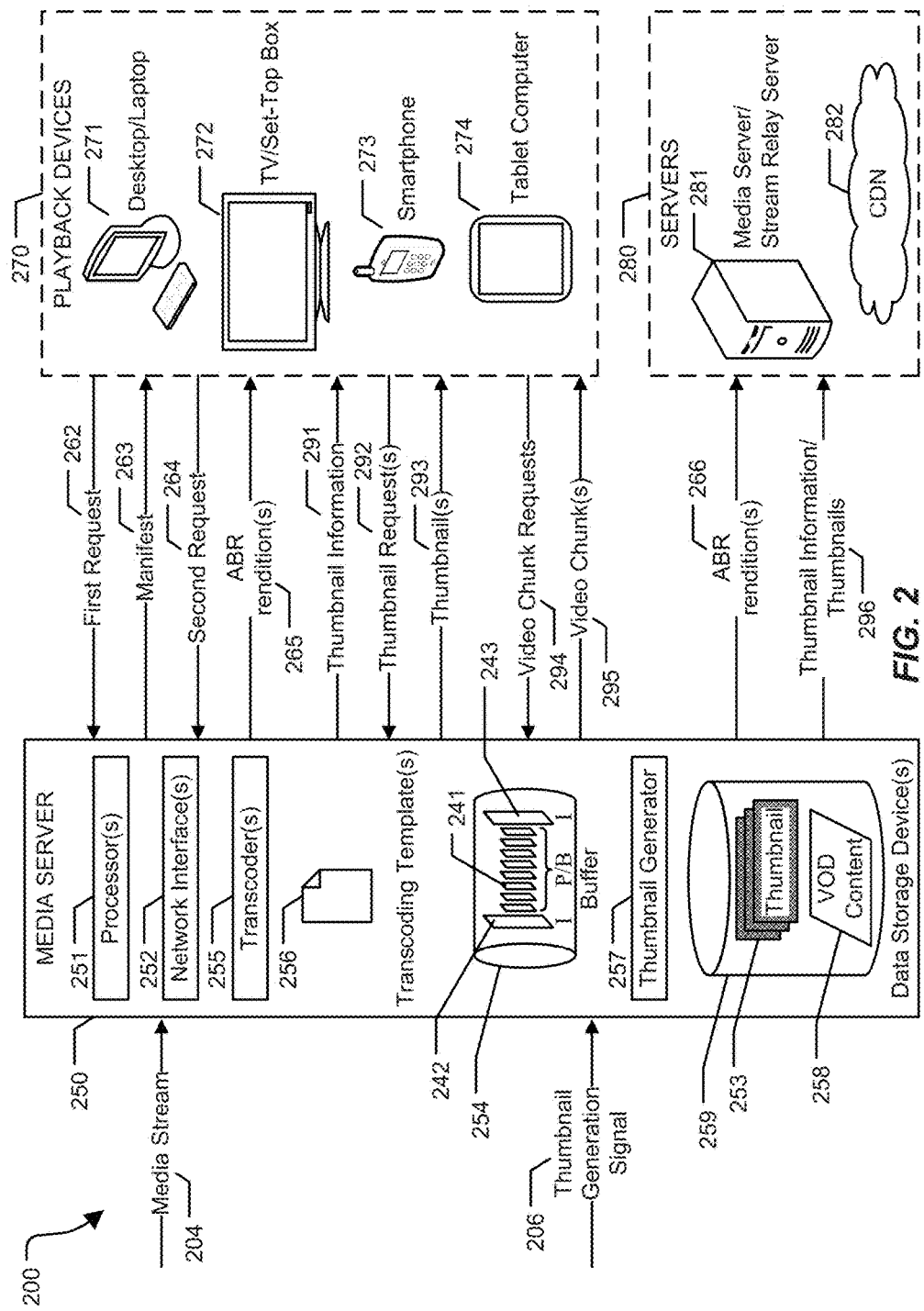
FIG. 2 is a diagram of a particular embodiment of a system that is operable to support thumbnail generation at a media server.

Whereas FIG. 1 illustrates thumbnail generation at an encoder device, the present disclosure also provides for thumbnail generation at a media server. For example, FIG. 2 illustrates a particular embodiment of a system 200 that includes a media server 250 configured to generate thumbnails. One or more functions or components of the media server 250 may correspond to functions or components of the media server 150 of FIG. 1, and/or vice versa.

The media server 250 may include one or more processor(s) 251 and various components that are executable by the processor(s) 251. The media server 250 may include software application(s) that perform media serving or processing, hardware systems (e.g., servers) that support or perform media serving and processing, or any combination thereof. Thus, various operations described with reference to the media server 250, or components thereof, may be implemented using hardware, software (e.g., instructions executable by the processor(s) 251), or any combination thereof.

The media server 250 may also include one or more network interface(s) 252. For example, the network interface(s) 252 may include input interface(s) and output interface(s) that are configured to receive data and to send data, respectively. In a particular embodiment, the network interface(s) 252 may be wired and/or wireless interfaces that enable the media server 250 to communicate data via a network, such as the Internet. For example, the network interface(s) 252 may include an Ethernet interface, a wireless interface compatible with an Institute of Electrical and Electronics Engineers (IEEE) 802.11 (e.g., Wi-Fi) protocol, or other wired or wireless interfaces.

Thus, the media server 250 may be configured to receive and send data from various other devices (e.g., via a network, such as a local area network (LAN) or the Internet, via a wired or wireless network connection). For example, the media server 250 may communicate with one or more playback devices 270 (e.g., devices configured to output a display of a stream of live content and/or a stream of a VOD content item) and one or more other servers 280. The one or more playback devices 270 may include the playback device 160 of FIG. 1. In a particular embodiment, the media server 250 may receive a media stream 204. In an illustrative example, the media stream 204 is received via one or more stream capture sources (e.g., a camera or a video encoder) or via one or more media content servers (e.g., a video on demand (VOD) database server or a server of a content delivery network (CDN)). Accordingly, the media stream 204 may include a live stream or a VOD stream. In an illustrative example, the media stream 204 includes encoded video frames generated by an encoder device, such as the encoder device 110 of FIG. 1. Alternatively, the media stream 204 may not include thumbnails, and thumbnails corresponding to the media stream 204 may be generated at the media server 250, as further described herein.

The media server 250 may support multiple coding technologies and protocols. For example, the media server 250 may support video encoding types including, but not limited to, H.264, On2 VP6, Sorenson Spark, Screen video, Screen video 2, motion picture experts group (MPEG) 2 (MPEG-2), MPEG-4 Part 2, and MPEG-4 Part 10. The media server 250 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The media server 250 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The media server 250 may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

The media server 250 may also include one or more transcoder(s) 255. The transcoder(s) 255 may include the transcoder 154 of FIG. 1. The transcoder(s) 255 may be configured to transcode the media stream 204 to generate multiple ABR rendition(s) 265 of the media stream 204. The ABR rendition(s) 265 may be at least temporarily stored at one or more data storage device(s) 259. The data storage device(s) 259 may include the data storage device(s) 157 of FIG. 1. In a particular embodiment, the data storage device(s) 259 also store VOD content 258 and/or DVR content. For example, the transcoder(s) 255 may transcode the VOD content 258 to generate multiple ABR renditions of the VOD content 258, so that the media server 250 may provide VOD streams to one or more of the playback devices 270.

The ABR rendition(s) 265 of the media stream 204 may correspond to different quality renditions of the media stream 204. For example, the transcoder(s) 255 may generate a high-quality ABR rendition of the media stream 204 and/or may generate a lower-quality ABR rendition of the media stream 204 that is suitable for streaming in low-bandwidth network conditions. The transcoder(s) 255 may be configured to perform bitrate conversion, CODEC conversion, frame size conversion, etc. Moreover, such transcoding may be performed in response to requests from the playback devices 270. Thus, the media server 250 may be able to generate multiple ABR rendition(s) 265 of the media stream 204 for different playback devices 270 experiencing different network conditions.

The one or more ABR rendition(s) 265 may be sent to the one or more playback devices 270. For example, depending on a playback format supported by a requesting playback device 270, and/or transcoding parameters in use by the transcoder(s) 255, the media server 250 may send one or more ABR renditions to the playback devices 270 based on requests received from the playback devices 270. In a particular embodiment, parameters used by the transcoder(s) 255 are stored in one or more transcoding template(s) 256. For example, the transcoding template(s) 256 may be computer-readable files (e.g., eXtensible markup language (XML) files) that define transcoding parameters (e.g., bitrate, type of CODEC, etc.) for various stream renditions.

The media server 250 may also include a thumbnail generator 257. The thumbnail generator 257 may generate a thumbnail from a particular frame of the media stream 204, such as in response to receiving a thumbnail generation signal 206. In an illustrative embodiment, the thumbnail generation signal 206 is generated (or asserted) as described with reference to the thumbnail generation signal 121 or 131 of FIG. 1. Alternatively, the media server 250 may include an image processing engine that generates (or asserts) the thumbnail generation signal 206 based on determining that a particular image (e.g., frame) of the media stream 204 satisfies a thumbnail generation condition. Alternatively, or in addition, the media server 250 may be configured to monitor social networking activity associated with the media stream 204 to determine if a thumbnail generation condition has been satisfied.

When a thumbnail generation condition is satisfied by a particular frame of the media stream 204, the thumbnail generator 257 may generate a thumbnail from the particular frame. In contrast to FIG. 1, however, the frames of the media stream 204 may be encoded, and thus the particular frame may be a p-frame or a b-frame. To generate a thumbnail from a p-frame or a b-frame, the thumbnail generator 257 may decode the p-frame or b-frame based on one or more preceding and/or subsequent frames of the media stream 204, such as i-frames. To facilitate such decoding, the media server 250 may include a buffer 254, which may operate as described with reference to the buffer 155 of FIG. 1. The buffer 254 may store at least a subset of frames of the media stream 204 that can be used during thumbnail generation. For example, generating a thumbnail from a first frame (e.g., a p-frame or a b-frame) 241 may include decoding the first frame 241 based on one or more second frames (e.g., i-frames) 242, 243 stored in the buffer 254. In a particular embodiment, the buffer 254 may be a circular buffer that is configured to store a particular number of frames or a particular duration of video, such as a number of frames or duration of video corresponding to one or more GOPs (or chunks).

Thus, FIG. 2 illustrates an embodiment of thumbnail generation at a media server based on a received video stream, as opposed to thumbnail generation at an encoder device based on "raw" images, as in FIG. 1. However, it should be noted that in some implementations, features from the embodiments of FIG. 1 and FIG. 2 may be combined. For example, a media server may automatically generate thumbnails for media streams that do not already include thumbnails generated by an encoder device. Alternatively, the encoder device may generate full-resolution thumbnails and the media server may generate lower-resolution thumbnails to provide to playback devices having downlink bandwidth limitations. The encoder device and/or the media server may be configured to transcode thumbnails into different image formats (e.g., bitmap (BMP), joint photographic experts group (JPEG), graphics interchange format (GIF), portable network graphics (PNG), etc.). The encoder device and/or the media server may also be configured to automatically perform additional image processing/manipulation operations for thumbnails, such as resizing, color space conversion, flipping, rotation, cropping, etc.

During operation, the media server 250 may extract thumbnails from the media stream 204 (and/or the VOD content 258), generate thumbnails from the media stream 204 (and/or the VOD content 258) based on the thumbnail generation signal 206, or both. The media server 250 may also perform transcoding of the media stream 204 (and/or the VOD content 258) for adaptive streaming. As described above, adaptive streaming is a media transmission mechanism that enables a receiving device to dynamically request different versions of a stream in response to changing network conditions. For example, one of the playback devices 270 (e.g., a desktop or laptop computing device 271, a television or set-top box 272, a smartphone 273, or a tablet computer 274) may initiate an adaptive streaming session with the media server 250 for the media stream 204 (and/or a particular VOD content 258 item) by sending a first request 262. In an illustrative example, the first request 262 is generated in response to a user selecting a link to the media stream 204 (e.g., on a webpage), where the link specifies an Internet address of the media server 250. The media server 250 may send a manifest 263 to the initiating device (e.g., the computing device 271) in response to the first request 262. The manifest 263 may include information describing each of the plurality of ABR rendition(s) 265 (if any) of the media stream 204 and/or the VOD content 258 items. For example, the transcoding template(s) 256 may define particular available ABR rendition(s) 265 of the media stream 204 and the manifest 263 may be automatically generated based on the transcoding template(s) 256.

Upon receiving the manifest 263, the computing device 271 may determine which (if any) of the available ABR rendition(s) 265 of the media stream 204 should be requested from the media server 250. For example, the computing device 271 may make such a determination based on buffering/processing capability at the computing device 271 and/or network conditions being experienced by the computing device 271.

Upon determining which ABR rendition should be requested, the computing device 271 may transmit a second request 264 to the media server 250. The second request 264 may specify a particular ABR rendition of the media stream 204. If there are no problems with receipt and playback of the requested ABR rendition of the media stream 204, the computing device 271 may continue to receive the requested ABR rendition of the media stream 204 for continued playback. However, if playback and/or network conditions become worse, the computing device 271 may switch to a lower bitrate rendition by requesting a lower bitrate ABR rendition of the media stream 204. Conversely, if playback and/or network conditions improve, the computing device 271 may switch to a higher bitrate rendition. The transcoder(s) 255 may generate key frame aligned portions for the adaptive streaming renditions, so that switching to a lower bitrate or higher bitrate ABR rendition appears "seamless" (e.g., does not result in noticeable visual glitches or dropped frames at a playback device 270, such as the computing device 271, the television/set-top box 272, the smartphone 273, or the tablet computer 274).

Thus, during an adaptive streaming session, the media server 250 may receive the second request 264 from the computing device 271 for a particular ABR rendition of the media stream 204. Upon receiving the second request 264, the media server 250 may check whether the requested ABR rendition of the media stream 204 is stored in the one or more data storage device(s) 259. If so, the media server 250 may respond to the second request 264 by retrieving the requested ABR rendition from the one or more data storage device(s) 259 and transmitting the requested ABR rendition to the computing device 271. If the requested ABR rendition is part of a different ABR rendition, the transcoder(s) 255 may generate the requested ABR rendition by transcoding the media stream 204, and the generated ABR rendition(s) 265 may be transmitted to the computing device 271 in response to the second request 264. In a particular embodiment, sending the generated ABR rendition(s) 265 to the computing device 271 includes encoding and/or encapsulating the generated ABR rendition(s) 265 in accordance with the adaptive streaming protocol being used by the computing device 271 (e.g., HLS, HDS, smooth streaming, MPEG-DASH, etc.). As additional adaptive streaming requests are received from the computing device 271 for the same or other renditions of the VOD item, the transcoder(s) 255 may generate the additional requested portions on the fly as needed.

As described with reference to FIG. 1, the media server 250 may also generate and transmit thumbnail information 291 to the playback devices 270. The thumbnail information 291 may describe available thumbnails associated with the media stream 204. The thumbnail information 291 may be transmitted as part of the manifest 263, along with the ABR rendition(s) 265, or separately. The media server 250 may receive thumbnail request(s) 292 from the playback devices 270 in response to the thumbnail information 291, and may provide the requested thumbnail(s) 293 to the playback devices 270. The media server 250 may also receive video chunk requests 294 and respond with video chunk(s) 295, as shown.

The described techniques may also be used to generate and transmit multiple ABR rendition(s) 266 of the media stream 204 and/or thumbnail information and thumbnails 296 from the media server 250 to other servers 280. For example, the media server 250 may transmit the ABR rendition(s) 266 and the thumbnail information and thumbnails 296 to another media server 281, a stream relay server, and/or to a server (e.g., an edge server) of a content delivery network (CDN) 282. To illustrate, thumbnail information and thumbnails 296 may be sent to edge servers of the CDN 282 to make the thumbnail information and thumbnails 296 more readily available to devices in different geographic regions. In a particular embodiment, requested content at the CDN 282 may be set up using a pull through caching mechanism. The CDN 282 may include one or more edge HTTP caching servers. If a cache miss for requested content occurs at a caching server, the caching server may pull the requested content from the media server 250, which acts as an origin server. FIG. 2 thus illustrates a system 200 in which the media server 250 is configured to perform thumbnail generation and support ABR streaming to multiple playback devices/servers.

Figure 5:
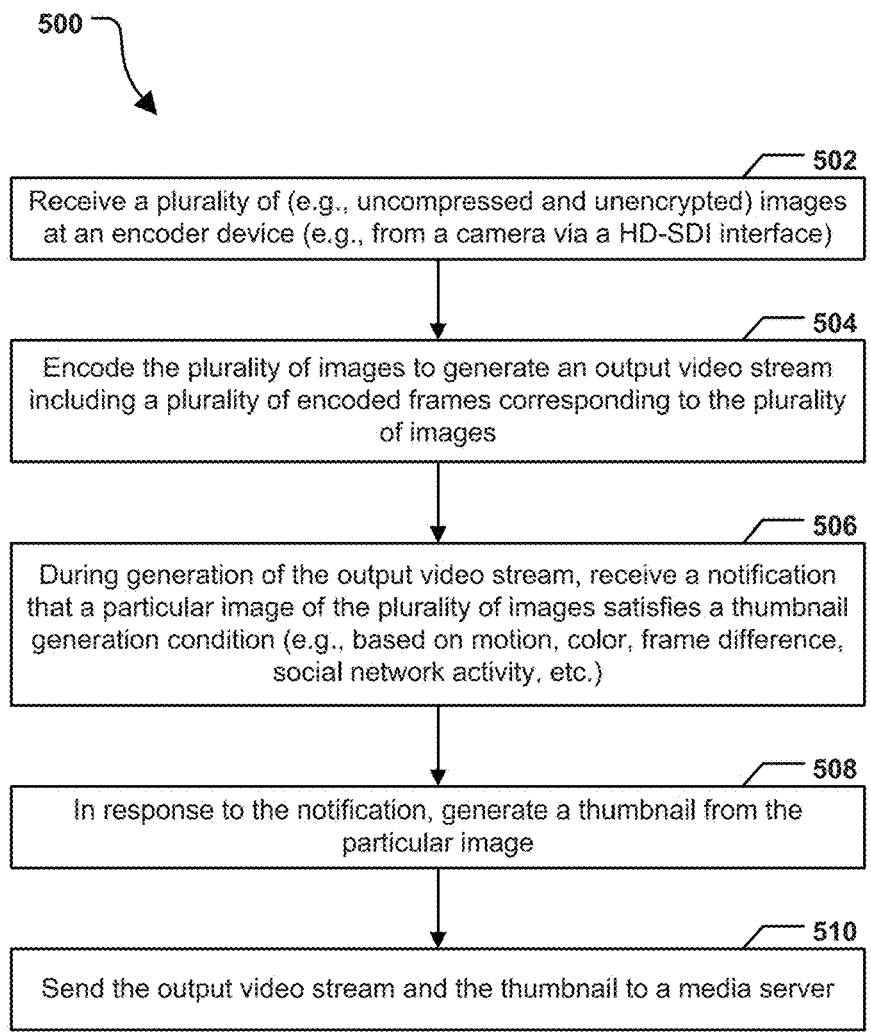
FIG. 5 is a flowchart of a particular embodiment of a method of operation at an encoder device.

FIG. 5 is a flowchart to illustrate a particular embodiment of a method 500 of operation at an encoder device. In an illustrative embodiment, the method 500 may be performed by the encoder device 110 of FIG. 1.

The method 500 includes receiving a plurality of images at an encoder device, at 502. In a particular embodiment, the images are uncompressed, unencrypted, and/or received via a HD-SDI interface (e.g., from a camera). For example, in FIG. 1, the encoder 110 may receive the images 104.

The method 500 also includes encoding the plurality of images to generate an output video stream including a plurality of encoded frames corresponding to the plurality of images, at 504. For example, in FIG. 1, the encoder device 110 may encode the images 104 to generate the encoded video frames 113.

The method 500 further includes, during generation of the output video stream, receiving a notification that a particular image of the plurality of images satisfies a thumbnail generation condition, at 506. The thumbnail generation condition may be satisfied based on motion, color, frame difference, social network activity, etc. associated with the particular image, as illustrative non-limiting examples. For example, in FIG. 1, the thumbnail generation path 114 may receive the thumbnail generation signal 121 or the thumbnail generation signal 131.

The method 500 includes generating the thumbnail from the particular image in response to the notification, at 508. The method 500 also includes sending the output video stream and the thumbnail to a media server, at 510. To illustrate, the media stream may be communicated to the media server according to a communication protocol, and the thumbnail may be added in a supplemental data package supported by the communication protocol. For example, in FIG. 1, the thumbnail 143 may be added to the output video stream 140 in the supplemental data package 142.

Figure 6:
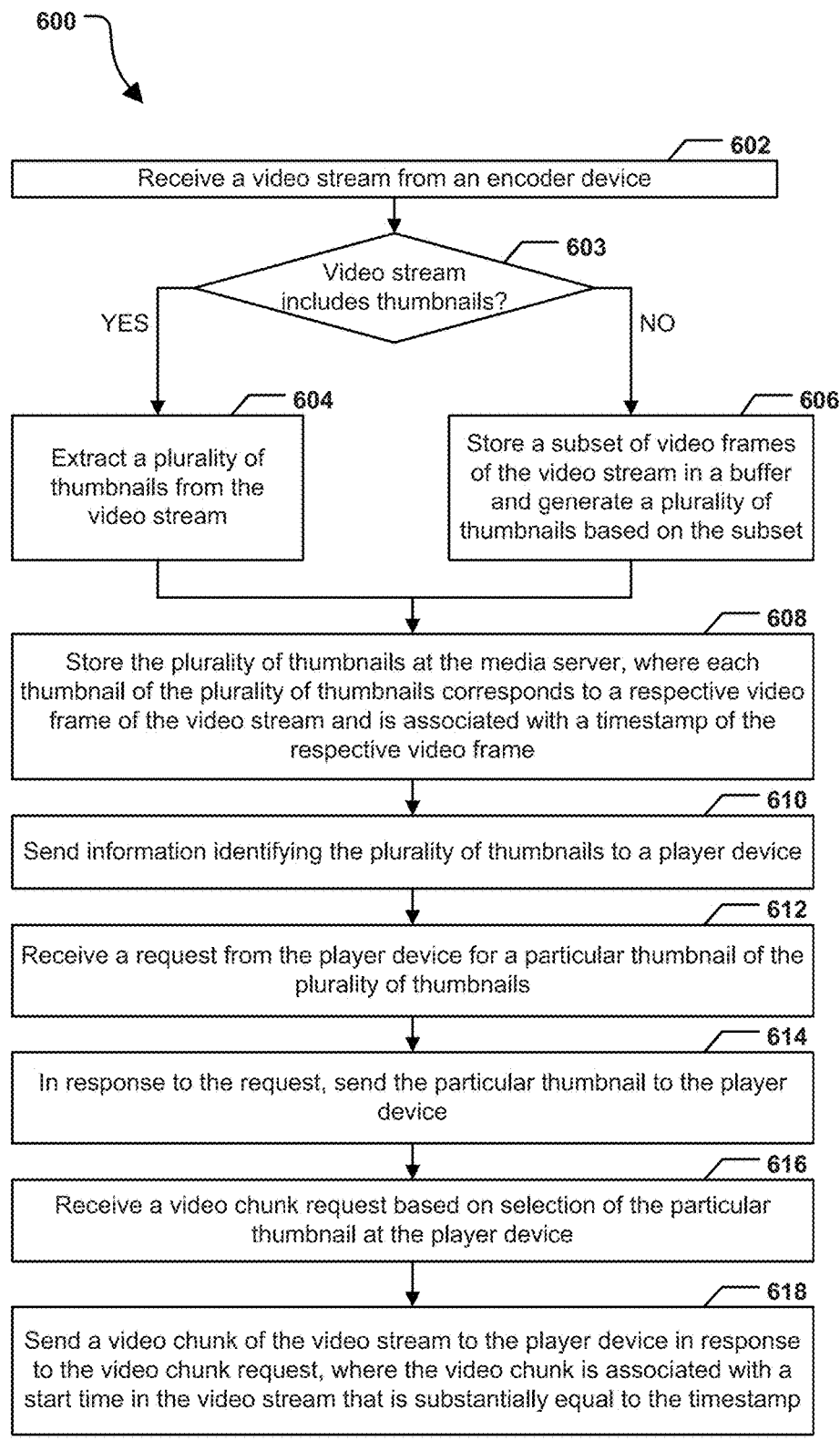
FIG. 6 is a flowchart of a particular embodiment of a method of operation at a media server.

FIG. 6 is a flowchart to illustrate a particular embodiment of a method 600 of operation at a media server. In an illustrative embodiment, the method 600 may be performed by the media server 150 of FIG. 1 and/or the media server 250 of FIG. 2.

The method 600 includes receiving a video stream from an encoder device, at 602. The method 600 further includes determining whether the received video stream includes thumbnails, at 603. For example, referring to FIG. 1, the media server 150 may determine whether the output video stream 140 includes thumbnails generated by the encoder device 110. When it is determined at 603 that the received video stream includes thumbnails, the method 600 includes extracting the thumbnails from the video stream at 604. For example, referring to FIG. 1, the media server 150 may extract the thumbnail(s) 143 from the output video stream 140. When it is determined at 603 that the received video stream does not include thumbnails, the method 600 includes storing a subset of video frames of the video stream in a buffer and generating a plurality of thumbnails based on the subset, at 606. For example, referring to FIG. 2, the thumbnail generator 257 at the media server 250 may generate the thumbnails 253 based on a subset of video frames stored in the buffer 254. To illustrate, when a thumbnail is generated for a p-frame or a b-frame the buffer 254 may be used to retrieve and decode one or more i-frames that the p-frame or b-frame depends from.

Continuing to 608, the media server may store the plurality of thumbnails, which may have been extracted from the video stream (at 604) or generated by the media server (at 606). Each thumbnail of the plurality of thumbnails may correspond to a respective video frame of the video stream and may be associated with a timestamp of the respective video frame. For example, referring to FIG. 1, the media server 150 may store the extracted thumbnails in the data storage device(s) 157 as the thumbnails 158. As another example, referring to FIG. 2, the media server 250 may store the thumbnails 253 generated by the thumbnail generator 257 in the data storage device(s) 259.

The method 600 further includes sending information identifying the plurality of thumbnails to a player device, at 610, and receiving a request from the player device for a particular thumbnail of the plurality of thumbnails, at 612. The method 600 also includes, in response to the request, sending the particular thumbnail to the player device, at 614, receiving a video chunk request based on selection of the particular thumbnail at the player device, at 616, and sending a video chunk of the video stream to the player device in response to the video chunk request, at 618. The video chunk may be associated with a start time in the video stream that is substantially equal to the timestamp. For example, referring to FIG. 1, the media server 150 may send the thumbnail information 161 to the player device 160, receive the thumbnail request 162 from the player device 160, send the thumbnail 163 to the player device 160, receive the video chunk request 164 from the player device 160, and send the video chunk(s) 165 to the player device 160. It should be noted that in alternative embodiments, certain steps illustrated in FIG. 6 may be skipped or performed in a different order. For example, when the player device 160 displays the scrub bar interface 300 of FIG. 3, certain video chunks may be provided to the player device 160 (and playback may begin at the player device 160) before the thumbnail request 162 is generated by the player device 160 and before the thumbnail 163 is provided to the player device 160. As another example, when the player device 160 displays the frame index 400 of FIG. 4, the thumbnail 163 may be provided to the player device 160 before the video chunks 165 are provided to the player device 160.

Figure 7:
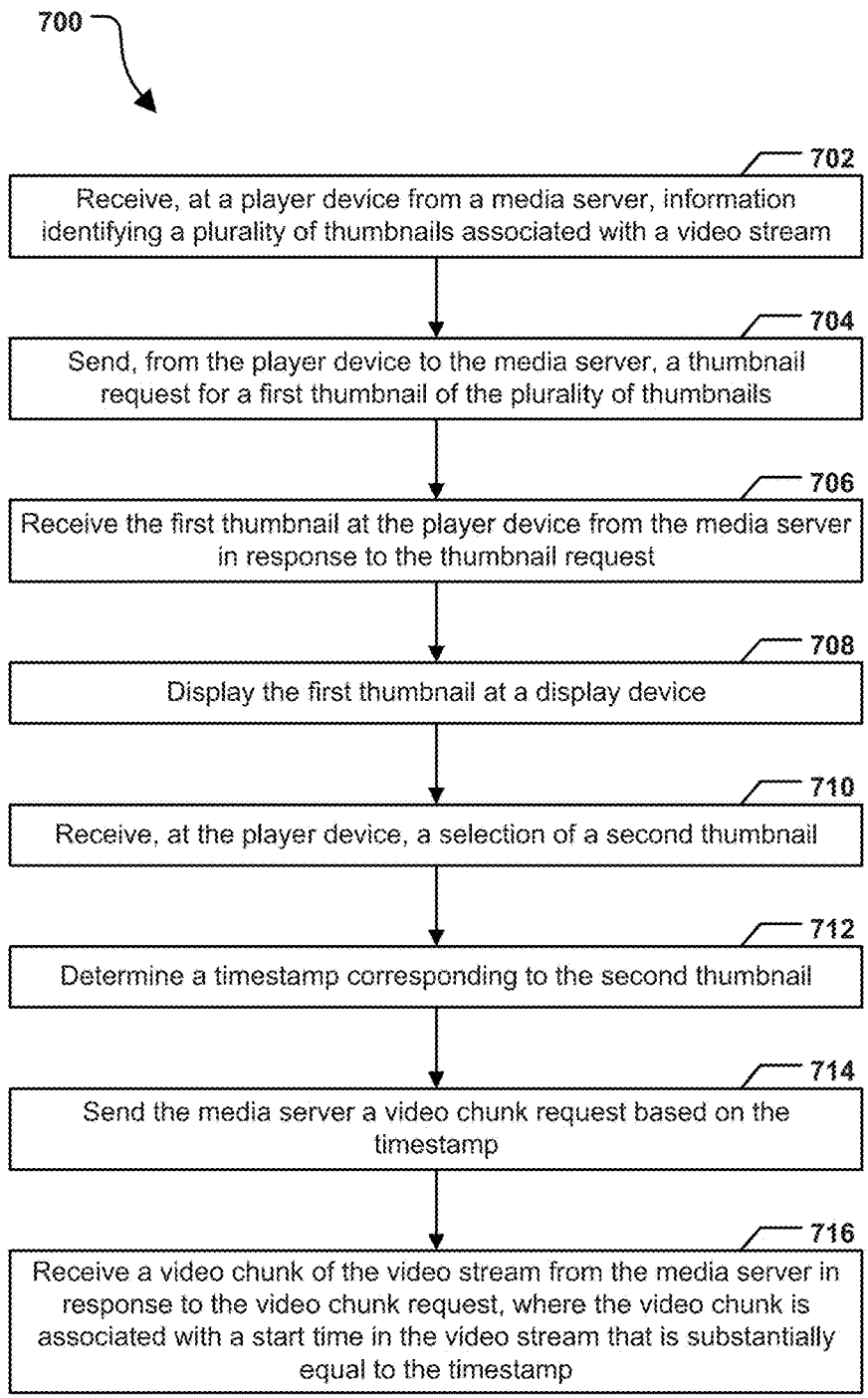
FIG. 7 is a flowchart of a particular embodiment of a method of operation at a player device.

FIG. 7 is a flowchart to illustrate a particular embodiment of a method 700 of operation at a player device. In an illustrative embodiment, the method 600 may be performed by the player device 160 of FIG. 1 and/or one of the playback devices 270 of FIG. 2.

The method 700 includes receiving, at a player device from a media server, information identifying a plurality of thumbnails associated with a video stream, at 702. The method 700 also includes sending, from the player device to the media server, a thumbnail request for a first thumbnail of the plurality of thumbnails, at 704. For example, referring to FIG. 1, the player device 160 may receive the thumbnail information 161 from the media server 150 and may send the thumbnail request 162 to the media server 150.

The method 700 also includes receiving the first thumbnail at the player device from the media server in response to the thumbnail request, at 706, and displaying the thumbnail at a display device, at 708. For example, referring to FIG. 1, the player device 160 may receive the thumbnail 163 and display the thumbnail 163 at a display device (e.g., a monitor, a touchscreen, etc.).

The method 700 includes receiving, at the player device, a selection of a second thumbnail, at 710, and determining a timestamp corresponding to the second thumbnail, at 712. As illustrative non-limiting examples, the second thumbnail may be selected from a scrub bar interface, as shown in FIG. 3, or from a frame index, as shown in FIG. 4. The second thumbnail may be the same as the first thumbnail or may be a different thumbnail. Advancing to 714, the method 700 includes sending the media server a video chunk request based on the timestamp. The method 700 also includes receiving a video chunk of the video stream from the media server in response to the video chunk request, at 716. The video chunk may be associated with a start time in the video stream that is substantially equal to the timestamp. For example, referring to FIG. 1, the player device 160 may send the video chunk request 164 to the media server 150 and may receive the video chunk(s) 165 from the media server 150 in response to the video chunk request 164. It should be noted that in alternative embodiments, certain steps illustrated in FIG. 7 may be skipped or performed in a different order. For example, when the player device 160 displays the scrub bar interface 300 of FIG. 3, certain video chunks may be received the player device 160 (and playback may begin at the player device 160) before the thumbnail request 162 is sent by the player device 160 and before the thumbnail 163 is received by the player device 160. As another example, when the player device 160 displays the frame index 400 of FIG. 4, the thumbnail 163 may be received by the player device 160 before the video chunks 165 are received by the player device 160.

Thus, it is to be understood that the order of steps or operations described with reference to FIGS. 1-7 is to be considered illustrative, not limiting. In alternate embodiments, the order of steps may be different. Further, one or more steps may be optional and/or replaced by other steps. In addition, one or more steps may be consolidated. In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof may include or may be included within any one or more of the capture device 102, the image processing engine 130, the encoder device 110, the media server 150, the player device 160 of FIG. 1, the media server 250, the desktop/laptop computing device 271, the TV/set-top box 272, the smartphone 273, the tablet computer 274, the media server/stream relay server 281, a server (e.g., edge server) of the CDN 282 of FIG. 2, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable storage device or a processor-readable storage device. The terms "computer-readable storage device" and "processor-readable storage device" include a single storage device or multiple storage devices, such as a centralized or distributed database, and/or associated caches and servers that store one or more sets of instructions. The terms "computer-readable storage device" and "processor-readable storage device" also include any device that is capable of storing a set of instructions for execution by a processor or that cause a computer system to perform any one or more of the methods or operations disclosed herein. For example, a computer-readable or processor-readable storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable storage device is not a signal.

As used herein, a "live" stream may differ from a "video on demand" (VOD) stream and a "digital video recorder" (DVR) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real-time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). A DVR stream corresponds to a time-shifted version of a live stream that is generated by a device that receives the live stream, where the device may still be receiving live stream or may have finished receiving the live stream. Thus, network DVR content may be generated by a device that receives a stream via a network and "records" the received stream, such as for subsequent transmission via a network to another device. The described systems and methods may be used in conjunction with "live linear television (TV)" streams, which may include a live feed, or a VOD asset or a DVR asset being rebroadcast as a live feed. It should also be noted that although certain embodiments may be described herein with reference to video streams, video on demand content, digital video recorder content, etc., not all of the described techniques may require video content/data. Certain embodiments may also be used with content that does not include video (e.g., audio on demand, radio content, music streams, etc.).

In a particular embodiment, a method includes receiving a plurality of images at an encoder device. The method also includes encoding the plurality of images to generate an output video stream, the output video stream including a plurality of encoded video frames corresponding to the plurality of images. The method includes, during generation of the output video stream, receiving a notification that a particular image of the plurality of images satisfies a thumbnail generation condition. The method also includes in response to the notification, generating a thumbnail from the particular image. The method further includes sending the output video stream and the thumbnail to a media server.

In another particular embodiment, an apparatus includes a memory and a processor storing instructions that, when executed by the processor, cause the processor to perform operations including receiving a video stream from an encoder device. The operations also include storing a plurality of thumbnails, where each thumbnail of the plurality of thumbnails corresponds to a respective video frame of the video stream and is associated with a timestamp of the respective video frame. The operations further include sending information identifying the plurality of thumbnails to a player device.

In another particular embodiment, a computer-readable storage device stores instructions that, when executed by a computer, cause the computer to perform operations that include receiving, at a player device from a media server, information identifying a plurality of thumbnails associated with a video stream. The operations also include sending, from the player device to the media server, a thumbnail request for a particular thumbnail of the plurality of thumbnails. The operations further include receiving the particular thumbnail at the player device from the media server in response to the thumbnail request and displaying the particular thumbnail at a display device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
receiving a plurality of images at an encoder device, the plurality of images encoded by the encoder device to generate an output video stream, the output video stream including a plurality of encoded video frames corresponding to the plurality of images, wherein the plurality of images is associated with a live event;
while receiving the plurality of images and generating the output video stream:
receiving, at the encoder device, a notification that a particular image of the plurality of images satisfies a thumbnail generation condition, wherein the thumbnail generation condition is associated with a number of posts uploaded onto at least one social networking website; and
sending the output video stream concurrently with a supplemental data package to a media server, wherein the supplemental data package comprises a thumbnail and metadata associated with the thumbnail, the thumbnail generated from the particular image responsive to receiving the notification.

2. The method of claim 1, wherein the plurality of encoded video frames comprises one or more intra-coded frames (i-frames), one or more predicted frames (p-frames), one or more bidirectionally predicted frames (b-frames), or any combination thereof.

3. The method of claim 1, wherein the metadata comprises an indicator associated with a type of a device used to capture the plurality of images.

4. The method of claim 1, wherein the metadata further comprises a timestamp, and wherein the timestamp corresponds to a playback time of an encoded video frame, the encoded video frame corresponding to the particular image from which the thumbnail is generated.

5. The method of claim 1, wherein the notification is received from a device external to the encoder device.

6. The method of claim 1, wherein the notification is generated at the encoder device.

7. The method of claim 1, wherein the thumbnail generation condition is satisfied in response to a first determination that a particular object is in the particular image.

8. The method of claim 7, wherein the thumbnail generation condition is satisfied in response to a second determination that a first threshold amount of the particular image includes a particular color or that a region of the particular image differs from a corresponding region of a preceding image by a second threshold amount.

9. The method of claim 1, wherein the plurality of images is received from a capture device, via a high-definition serial digital interface (HD-SDI), via a high-definition multimedia interface (HDMI), via a Thunderbolt interface, via an uncompressed video transmission protocol, or a combination thereof.

10. The method of claim 1, wherein the number of posts satisfies a threshold value.

11. The method of claim 1, wherein a second thumbnail generation condition is based on stream analysis of one or more of the plurality of images, wherein the stream analysis comprises analysis of motion of one or more objects depicted within the one or more of the plurality of images.

12. The method of claim 1, wherein a second thumbnail generation condition is based on stream analysis of one or more of the plurality of images, wherein the stream analysis is performed automatically without user input.

13. A media server comprising:
a processor; and
a memory storing instructions that, when executed by the processor, cause the processor to perform operations comprising:
receiving a video stream from an encoder device, the video stream associated with a plurality of thumbnails, wherein each thumbnail of the plurality of thumbnails corresponds to a respective video frame of the video stream and is associated with a timestamp of the respective video frame;

sending a data file to a player device, wherein the data file includes first information corresponding to a plurality of adaptive bitrate (ABR) renditions of the video stream, the plurality of ABR renditions associated with an ABR streaming protocol associated with the video stream, and includes second information corresponding to the plurality of thumbnails;

after sending the data file to the player device, receiving a request from the player device for a particular thumbnail of the plurality of thumbnails, wherein the request indicates a selected ABR rendition of the plurality of ABR renditions and wherein the request is based on the first and second information contained in the data file; and in response to the request, sending the particular thumbnail to the player device.

14. The media server of claim 13, wherein the request further includes a request for a particular ABR rendition of the video stream, and wherein the operations further comprise:

extracting the plurality of thumbnails from the video stream;

in response to receiving the request, retrieving the requested ABR rendition; and sending the requested ABR rendition to the player device.

15. The media server of claim 13, further comprising a buffer configured to store a subset of video frames of the video stream, and wherein at least one of the plurality of thumbnails is generated at the media server based on a first frame decoded based on a second frame of the subset of video frames stored in the buffer.

16. The media server of claim 13, wherein the operations further comprise converting the particular thumbnail to a file format supported by the player device.

17. A non-transitory computer-readable storage device storing instructions that, when executed by a computer, cause the computer to perform operations comprising:

receiving, at a player device from a media server, a data file, wherein the data file includes first information corresponding to a plurality of adaptive bitrate (ABR) renditions of a video stream, the plurality of ABR renditions of the video stream associated with an ABR streaming protocol, and second information identifying a plurality of thumbnails, the plurality of thumbnails associated with the video stream;

after receiving the data file, sending, from the player device to the media server, a request for a particular thumbnail of the plurality of thumbnails in response to the second information identifying the plurality of thumbnails, wherein the request indicates a particular ABR rendition of the plurality of ABR renditions and wherein the request is based on the first and second information contained in the data file;

receiving the particular thumbnail at the player device from the media server in response to the request; and displaying the particular thumbnail at a display device.

18. The non-transitory computer-readable storage device of claim 17, wherein the operations further comprise selecting the particular ABR rendition from the plurality of ABR renditions identified in the first information.

19. The non-transitory computer-readable storage device of claim 18, wherein the operations further comprise:

receiving, at the player device, a selection of supplemental video frames based on the particular thumbnail;

sending, to the media server, a video chunk request based on a timestamp corresponding to the supplemental video frames based on the particular thumbnail; and receiving a video chunk of the video stream from the media server in response to the video chunk request, wherein the video chunk is associated with a start time in the video stream that is substantially equal to the timestamp.

* * * * *